(12) United States Patent
Wu

(10) Patent No.: US 6,446,338 B1
(45) Date of Patent: Sep. 10, 2002

(54) METHOD OF SLUICE GATE VALVE FABRICATION

(76) Inventor: Lei-Jui Wu, No. 13, Fang Yuan Hsiang, Hou Liao Tsun, Kung Chu 4 Road, Chang Hua Hsien (TW)

( * ) Notice: Subject to any disclaimer, the term of this patent is extended or adjusted under 35 U.S.C. 154(b) by 0 days.

(21) Appl. No.: 09/887,428

(22) Filed: Jun. 25, 2001

(51) Int. Cl.[7] ................................................. B21K 1/20
(52) U.S. Cl. ........................ 29/890.128; 29/890.129; 29/890.131; 29/890.132; 29/190.124
(58) Field of Search ....................... 29/890.12, 890.124, 29/890.126, 890.128, 890.129, 890.13, 890.131, 890.132, 557, 428; 72/327, 358, 352; 228/112.1, 172, 144; 251/329, 326

(56) References Cited

U.S. PATENT DOCUMENTS

| | | | | |
|---|---|---|---|---|
| 1,828,478 A | * | 10/1931 | Sparks | |
| 2,065,035 A | * | 12/1936 | Taylor | |
| 3,197,175 A | * | 7/1965 | Siepmann | |
| 3,681,960 A | * | 8/1972 | Tadokoro | |
| 3,769,673 A | * | 11/1973 | Siepmann | |
| 4,243,204 A | * | 1/1981 | Siepmann | |
| 4,319,736 A | * | 3/1982 | Muller et al. | |
| 4,356,612 A | * | 11/1982 | Becker et al. | |
| 4,443,920 A | * | 4/1984 | Oliver | |

* cited by examiner

Primary Examiner—David P. Bryant
Assistant Examiner—T. Nguyen
(74) Attorney, Agent, or Firm—Troxell Law Office PLLC

(57) ABSTRACT

An improved method of sluice gate valve fabrication in which a cylindrical rod of an appropriate diameter is first cut and then the cylindrical rod is forged into a blank for a disk-shaped sluice gate body and pivot stems, with the pivot stems respectively formed at the upper and lower ends of the sluice gate body to provide for installing the pivot stems in the interior section of the sluice valve. The raw edges along the periphery of the blank are then removed by pressure punching to form a finished sluice gate body. The pivot stem at the lower end of the sluice valve body is machined into an abraded welding surface and then a shaft having the same diameter of the pivot stem is aligned with abraded welding surface and friction welded to it. As such, the pre-forged sluice gate and the friction welding of an existent shaft onto the pivot stem at the lower end of the sluice gate body minimizes forging mold volume and, furthermore, reduces the quantity of material required for sluice gate fabrication.

1 Claim, 3 Drawing Sheets

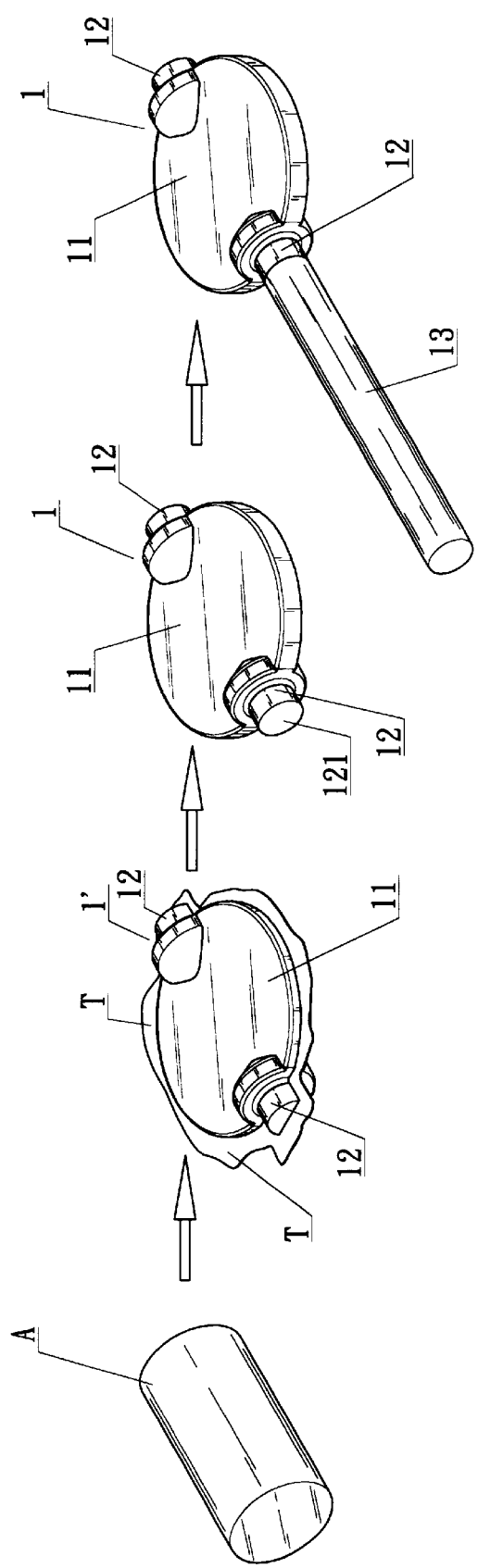

METHOD OF SLUICE GATE VALVE FABRICATION

BACKGROUND OF THE INVENTION

1) Field of the Invention

The invention herein relates to an improved method of sluice gate valve fabrication, wherein a cylindrical rod of an appropriate diameter is first forged into a sluice gate body blank, the rough edges of which are removed by punching, and then a shaft having the same diameter is aligned with an abraded welding surface of a pivot stem at the lower end and conjoined to it by friction welding; as such, the present invention minimizes forging mold volume and, furthermore minimizes the overall quantity of material utilized for sluice gate valve fabrication to thereby reduce the production costs of the manufacturer

2) Description of the Prior Art

In conventional sluice gate fabrication, casting is the predominant production method; however most of the components fabricated by such methods have surface pitting (sand holes) that easily results in liquid and gas leakage during usage; furthermore, since the shaft of the sluice gate is excessive in length, the molten material cannot be equally distributed during sluice gate casting and, furthermore, the lengthy shaft cannot be cast at an exact perpendicular angle, this readily results in incorrect shape flaws; in view of this, manufacturers are researching and developing forged fabrication methods.

The improved sluice gate valve fabrication method based on forging typically involves a cylindrical rod A' of a certain diameter that is forged into a body 21 of a sluice gate as well as a shaft 22 section at the bottom of the body 21; the rough edges T formed by casting along the blank 2' are then removed by punching to form the completed sluice gate 2; however, in the fabrication method of such sluice gates 2, since the width of the unforged cylindrical rod A' has to be sufficient enough to become forged into the circular shape of the body 21, the cylindrical rod A' must be of a larger diameter; as such, since the diameters of the cylindrical rod A' before and after punching differ considerably, much forged material is wasted following the punching of the shaft 22; furthermore, since the shaft length of the finished product varies and each shaft length requires a different forming mold, the production cost of the manufacturer is increased.

In view of the drawbacks associated with the conventional fabrication method, the inventor of the invention herein conducted extensive research and development that culminated in the successful development of the present invention.

SUMMARY OF THE INVENTION

The primary objective of the invention herein to provide an improved method of sluice gate valve fabrication, wherein a cylindrical rod of an appropriate diameter is first cut and then the cylindrical rod is forged into a one-piece blank for a disk-shaped sluice gate body having pivot stems; the raw edges along the periphery of the blank are then removed by pressure punching to form the body of the sluice gate; and a shaft having the same diameter as the pivot stem at the lower end is aligned with and conjoined to it by friction welding; as such, the quantity of material utilized for the cylindrical rod is minimized.

Another objective of the invention herein to provide an improved method of sluice gate valve fabrication, wherein since the sluice valve dimensions are based on world standard specifications, the sluice valve molds are of uniform sizes; the pre-forged sluice gate body portion and the friction welded shaft section enable meeting the shaft length requirements of users because shafts of different length specifications can be freely selected, with different sized molds only needed for changes in the shaft section to thereby minimize shaft mold volume.

BRIEF DESCRIPTION OF THE DRAWINGS

FIG. 1-B is an isometric drawing of a conventional sluice gate after forging.

FIG. 1-C is an isometric drawing of a conventional sluice gate after pressure punching.

FIG. 3-A is an isometric drawing of the sluice gate of the invention herein before forging.

FIG. 3-B is an isometric drawing of the sluice gate of the invention herein after forging.

FIG. 3-C is an isometric drawing of the sluice gate of the invention herein after pressure punching.

FIG. 3-D is an isometric drawing of the sluice gate of the invention herein after the abrading and welding of the shaft.

DETAILED DESCRIPTION OF THE INVENTION

Figure 1:
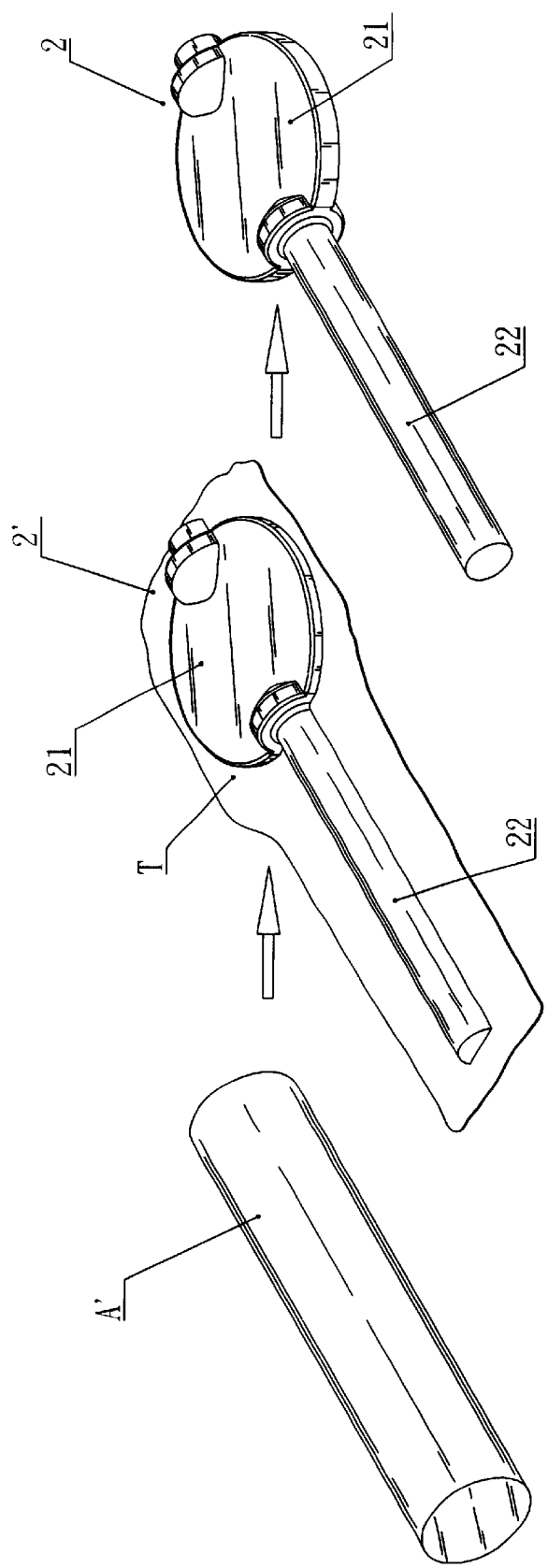
FIG. 1-A is an isometric drawing of a conventional sluice gate before forging.
Figure 2:
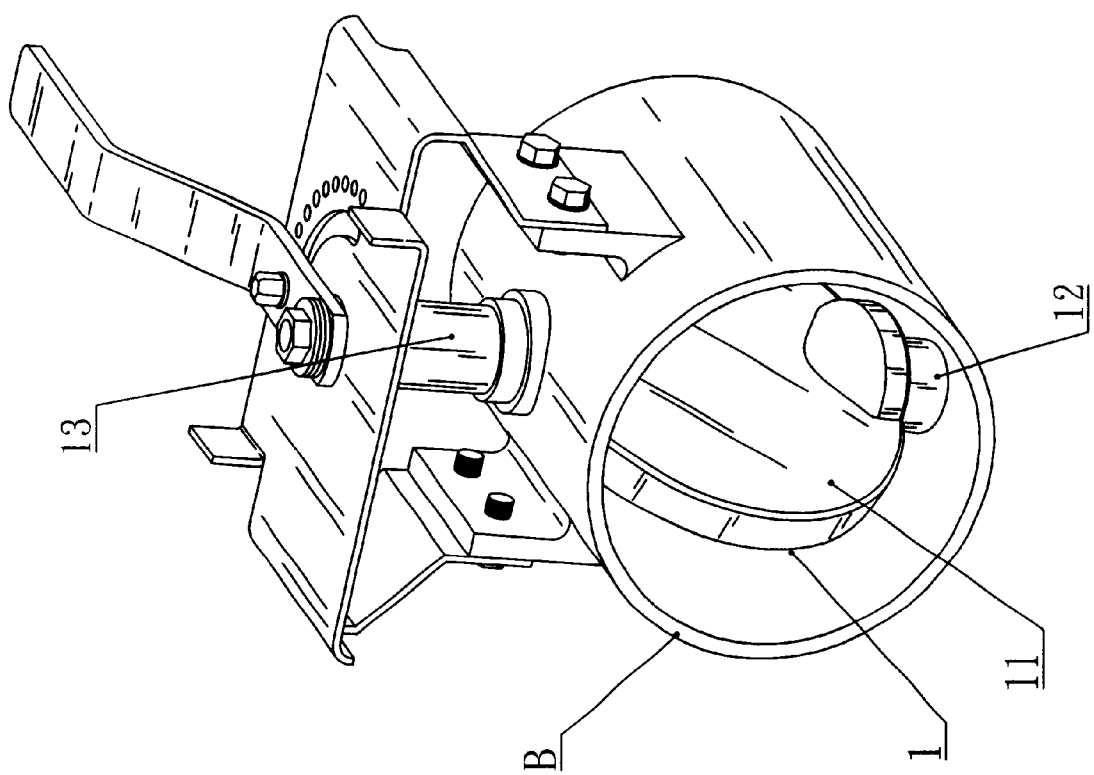
FIG. 2 is an isometric drawing of the practical arrangement of the invention herein.

Referring to FIG. 2, the said sluice gate valve fabrication method is comprised of: (a) Forging a Cylindrical Rod into a Sluice Gate; (b) Pressure Punching the Raw Edges; and (b) Abrading and Welding, of which:

(a) Forging a Cylindrical Rod into a Sluice Gate

First, a cylindrical rod A of an appropriate diameter is cut and then the cylindrical rod A is forged into a one-piece blank 1' for a disk-shaped sluice gate body 11 and pivot stems 12, with the said pivot stems 12 respectively formed at the upper and lower ends of the sluice gate body 11 to provide for installing the pivot stems 12 in the interior section of a sluice valve B.

(b) Pressure Punching the Raw Edges

The raw edges T along the periphery of the blank 1' are then removed by pressure punching to form a finished sluice gate 1.

(c) Abrading and Welding

The pivot stem 12 at the lower end of the said sluice valve body 11 is machined into an abraded welding surface 121 and then a shaft 13 having the same diameter as the pivot stem 12 is aligned with the abraded welding surface 121 and friction welded to it such that the sluice gate 1 and the shaft 13 are conjoined into a single entity.

As such, since the sluice gate body 11 of the sluice gate 1 is first forged and the existent shaft 13 is friction welded to the pivot stem 12 at the lower end of the sluice gate body 11, the length of the cylindrical rod A before forging only has to be sufficient enough to match the forged length of the body 11 and then the forged body 11 and the shaft 13 are friction welded together; therefore, when the sluice gate is fabricated, the material utilized for the cylindrical rod A is minimized to reduce the production costs of the manufacturer.

Furthermore, since sluice valves are of standard dimensions, the pre-forged sluice gate body 11 portion and the friction welded shaft 13 section enable meeting the shaft length requirements of users in that shafts of different length specifications can be freely selected to thereby minimize shaft mold volume and reduce manufacturer production costs.

What is claimed is:

1. A method of forming a sluice gate valve comprising the steps of:

a) providing a cylindrical rod with a predetermined diameter and length;

b) forging the cylindrical rod into a one-piece blank with a disk-shaped sluice gate body and pivot stems formed at upper and lower ends of the sluice gate body to provide for installing the pivot stems in an interior section of a sluice valve, wherein the one-piece blank having raw edges formed along its periphery.

c) removing raw edges along the periphery of the one-piece blank by pressure punching to form a finished sluice gate;

d) machining the pivot stem at the lower end of the sluice gate body to form an abraded welding surface;

e) providing a shaft having a same diameter as that of the abraded pivot stem;

f) aligning the shaft with the abraded welding surface; and, g) friction welding the aligned shaft and pivot stem such that the sluice gate body and the shaft are conjoined into a single entity.

* * * * *